(12) United States Patent
Byma et al.

(10) Patent No.: US 6,832,810 B2
(45) Date of Patent: Dec. 21, 2004

(54) FLEXIBLE HEADLINER FOR AUTOMOTIVE VEHICLE

(75) Inventors: George B. Byma, Clarkson, MI (US); Thomas Greiner, Bruckmuehl (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/396,998

(22) Filed: Mar. 25, 2003

(65) Prior Publication Data

US 2004/0090089 A1 May 13, 2004

Related U.S. Application Data

(60) Provisional application No. 60/393,920, filed on Jul. 5, 2002.

(51) Int. Cl.[7] .................................................. B60J 7/00
(52) U.S. Cl. ..................... 296/214; 428/317.1; 181/286
(58) Field of Search ................................ 296/214, 39.1, 296/211, 187.05, 191; 280/781; 442/225, 364, 394, 374, 58; 181/286; 428/304.4, 198, 300.7, 317.1, 292.1, 411.1; 264/402, 119; 425/384; 156/228, 214, 79

(56) References Cited

U.S. PATENT DOCUMENTS

| | | | | |
|---|---|---|---|---|
| 3,867,240 A | * | 2/1975 | Doerfling .................... 296/214 |
| 5,007,976 A | * | 4/1991 | Satterfield et al. .......... 296/214 |
| 5,049,439 A | * | 9/1991 | Robinson .................... 442/225 |
| 5,089,328 A | * | 2/1992 | Doerer et al. ............... 296/214 |
| 5,258,585 A | * | 11/1993 | Juriga ........................ 181/286 |
| 5,300,360 A | * | 4/1994 | Kocsis et al. ............ 428/304.4 |
| 5,441,675 A | * | 8/1995 | Souders ...................... 264/402 |
| 5,529,479 A | * | 6/1996 | Souders ...................... 425/384 |
| 5,536,556 A | * | 7/1996 | Juriga ........................ 181/286 |
| 5,549,776 A | * | 8/1996 | Juriga ........................ 156/228 |
| 5,709,925 A | * | 1/1998 | Spengler et al. ............ 428/198 |
| 5,804,262 A | * | 9/1998 | Stevens et al. ............. 296/214 |
| 5,853,843 A | * | 12/1998 | Patel et al. ................. 296/214 |
| 5,863,370 A | * | 1/1999 | Munro ....................... 156/214 |
| 5,942,321 A | * | 8/1999 | Romesberg et al. ...... 428/300.7 |
| 5,976,646 A | * | 11/1999 | Stevens et al. ............. 296/214 |
| 6,048,809 A | * | 4/2000 | Brow et al. ................. 442/364 |
| 6,124,222 A | * | 9/2000 | Gebreselassie et al. ..... 296/214 |
| 6,150,287 A | * | 11/2000 | Boyd et al. ................. 296/214 |
| 6,156,682 A | * | 12/2000 | Fletemier et al. ........... 442/394 |
| 6,204,209 B1 | * | 3/2001 | Rozek et al. ............... 442/374 |
| 6,214,456 B1 | * | 4/2001 | Boyd et al. .............. 428/317.1 |
| 6,413,613 B1 | | 7/2002 | Byma |
| 6,436,854 B1 | * | 8/2002 | North et al. ................... 442/58 |
| 6,508,362 B2 | | 1/2003 | Hnatow et al. |
| 6,582,639 B2 | * | 6/2003 | Nellis ......................... 264/119 |
| 2002/0122930 A1 | * | 9/2002 | Shimizu et al. .......... 428/317.1 |
| 2003/0026968 A1 | * | 2/2003 | Kojima .................... 428/292.1 |
| 2003/0141005 A1 | * | 7/2003 | Donatti et al. ................ 156/79 |
| 2003/0162023 A1 | * | 8/2003 | Hjortsberg ............... 428/411.1 |

FOREIGN PATENT DOCUMENTS

WO 97/10950 3/1997

* cited by examiner

Primary Examiner—Kiran Patel
(74) Attorney, Agent, or Firm—Bill C. Panagos

(57) ABSTRACT

This invention relates to a flexible headliner for an automotive vehicle. The headliner includes a flexible foam core layer having a nominal thickness of greater than 5 millimeters. A cover layer is bonded to a first side of the core layer. A backing layer is bonded to a second side of the core layer opposite the first side. The headliner is sized and shaped to conform to an interior roof of the vehicle. The invention also relates to particular methods of forming the headliner in a mold.

17 Claims, 2 Drawing Sheets

FLEXIBLE HEADLINER FOR AUTOMOTIVE VEHICLE

CROSS REFERENCE TO RELATED APPLICATIONS

This application claims the benefit of U.S. Provisional Application No. 60/393,920 filed Jul. 5, 2002.

BACKGROUND OF THE INVENTION

This invention relates in general to the interior trim for automotive vehicles, and in particular to headliners for such vehicles.

Automotive vehicles usually include a headliner that lines the interior of the roof of the vehicle in the region of the driver and passenger compartment. FIG. 1 shows a generic representation of an automotive headliner 10. The headliner provides an attractive appearance as well as providing some padding and acoustic damping. Headliners are sometimes made with polyurethane foam. Polyurethane headliners today are normally made with a semi-rigid foam or are impregnated with a resin and cured out and become semi-rigid. These headliners are designed for stiffness.

An example of a previously known headliner is described in International Patent Application WO 97/109050. This application discloses the use of a foam material which is impregnated with a hardening compound in order to provide an energy absorbent headliner. A fiberglass reinforcing layer is incorporated with the foam core to provide structural strength.

SUMMARY OF THE INVENTION

This invention relates to a flexible headliner for an automotive vehicle. The headliner includes a flexible foam core layer having a nominal thickness of greater than 5 millimeters. A cover layer is bonded to a first side of the core layer. A backing layer is bonded to a second side of the core layer opposite the first side. The headliner is sized and shaped to conform to an interior roof of the vehicle. Optionally, the headliner can also include a reinforcement that allows the headliner to maintain a desired shape while supporting its own weight and additional components that are part of a modular structure.

The invention also relates to methods of forming the headliner in a mold. For example, the core layer, cover layer and backing layer can be prelaminated outside the mold and then formed inside the mold. Alternatively, the core layer, cover layer and backing layer can be inserted into the mold and then laminated and formed inside the mold. Typically, a hot mold is used for forming the headliner. However, the headliner can also be formed using a cold mold by heating at least one of the core layer, cover layer and backing layer outside the mold. For example, the core layer, cover layer and backing layer can all be heated outside the mold and then laminated and formed inside the mold. Alternatively, the core layer and backing layer can be heated outside the mold, the cover layer prepositioned inside the mold, and then the core layer, backing layer and cover layer laminated and formed inside the mold. The latent heat of the core layer causes the cover layer to bond to the core layer.

Various advantages of this invention will become apparent to those skilled in the art from the following detailed description of the invention, when read in light of the accompanying drawings.

DETAILED DESCRIPTION OF THE INVENTION

Figure 1:
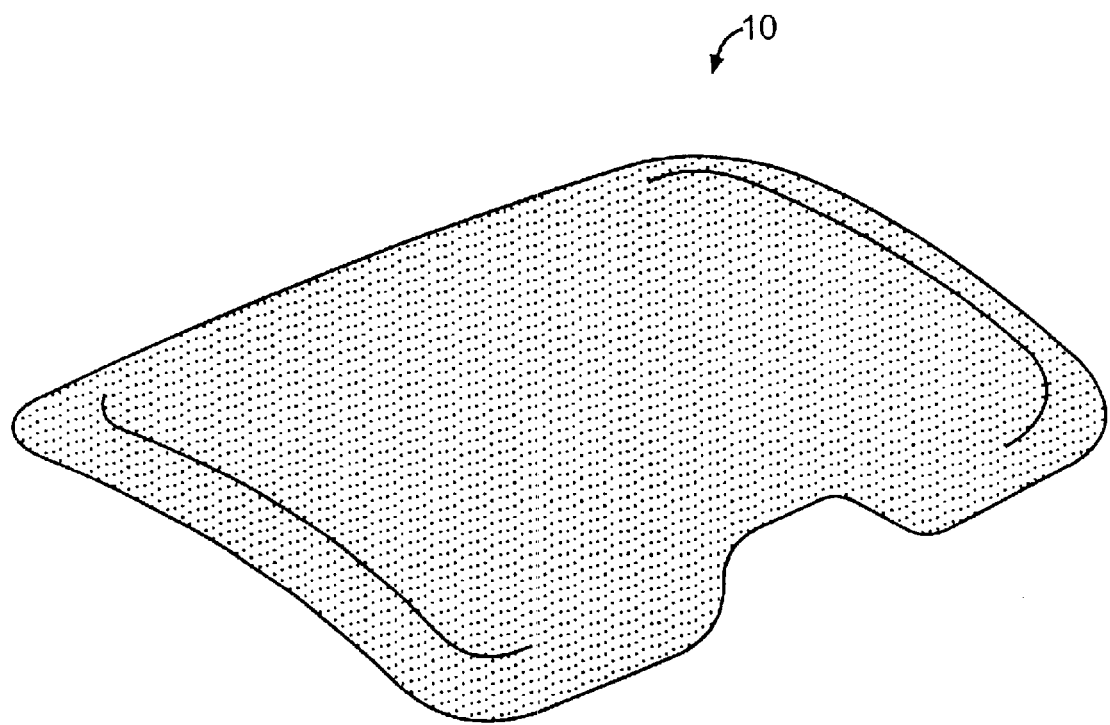
FIG. 1 is a perspective view of a headliner for an automotive vehicle.
Figure 2:
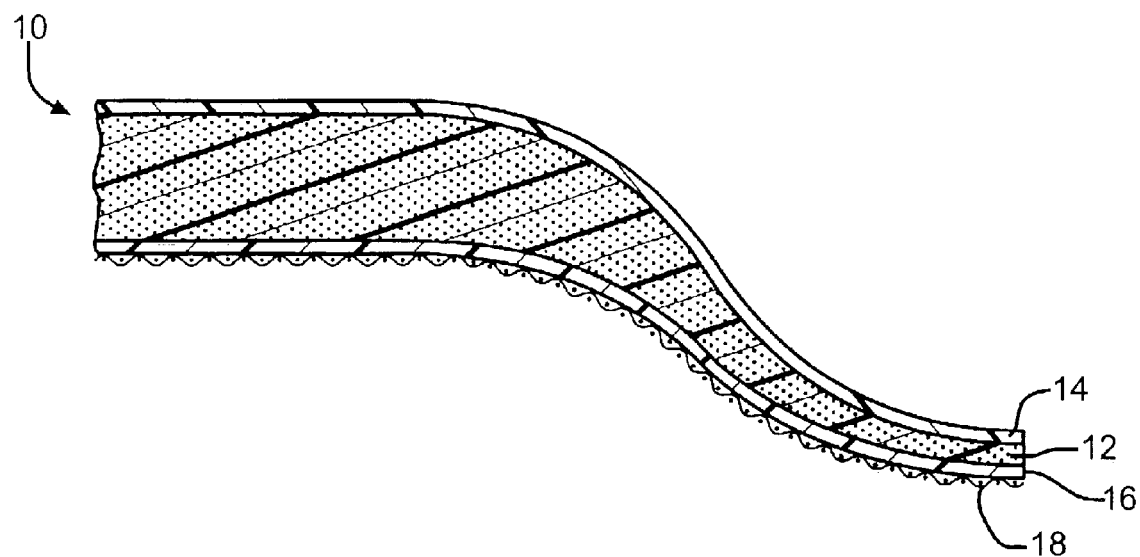
FIG. 2 is a cross-sectional view showing an edge of a flexible headliner for an automotive vehicle according to the invention.

In contrast to the current semi-rigid polyurethane headliners, the headliner of the invention is very flexible. As shown in FIG. 2, the headliner 10 is made with a flexible foam core layer 12, and a cover layer 18 and backing layer 14 that are flexible. The headliner can be bent double with no damage, and it recovers after bending or compression because of its flexibility. As a result, the headliner is flexible enough to be bent and put into a vehicle through a door. The flexibility of the headliner will make its installation very easy, and it will make airbag or air curtain deployment from behind the headliner very easy.

The flexible foam core layer 12 can be made from any suitable flexible foam. Different kinds of flexible foam are well-known. The flexible foam can be an open cell foam or a closed cell foam; in some embodiments, an open cell foam is preferred for its improved acoustic insulation properties. Preferably, the flexible foam is a thermoformable polyurethane foam. One suitable type of flexible polyurethane foam is manufactured by Foamex International, Inc., Linwood, Pa. Preferably, the flexible foam core layer is provided in the form of a slab which can be laminated to the other layers. A flexible polyurethane foam by Foamex is described in U.S. Pat. No. 6,508,362, issued Jan. 21, 2003 (incorporated by reference herein). The patent defines a "flexible" foam according to ASTM 1566. Some flexible polyurethane foams will heat set between about 170° C. and 210° C., and can be heat set down to about 2 mm.

The flexible foam core layer 12 of the headliner can be relatively thick while retaining its flexibility. This allows the headliner to provide improved acoustics and cushioning. The flexible foam core layer has a nominal thickness of greater than 5 millimeters, often at least about 15 millimeters, and sometimes as much as 20–35 millimeters. By "nominal" thickness is meant the thickness of the major portion of the headliner. For example, the edge portions of the headliner can be pinched down for fit and finish, and as a result the core layer in the edge portions can be less than 5 millimeters thick, while the remaining portions of the core layer are greater than 5 millimeters thick.

The cover layer 18 of the headliner is bonded to a first side of the core layer 12, and the backing layer 14 is bonded to a second side of the headliner opposite the first side. When the headliner is installed in an automotive vehicle, the cover layer will face downward toward the occupants of the vehicle, and the backing layer will face upward in contact with the interior roof of the vehicle. The cover layer and the backing layer can be made from any suitable materials. In a preferred embodiment, the backing layer is made from a solid (non-permeable) film to block noise, and the cover layer is made from a perforated (permeable) film or cloth to improve aesthetics and feel of the headliner. The size of the perforations can be optimized for acoustics and strength. The films can be made from any suitable material(s), for example, a polymer such as polypropylene or polyethylene. The cloth can be any suitable type of woven or nonwoven cloth.

In some embodiments of the invention, the cover layer is made from cloth, and the headliner additionally includes a polymer film between the cloth cover layer and the flexible foam core layer. The headliner 10 shown in FIG. 2 includes the flexible foam core layer 12 made from polyurethane foam. A first polymer film 14 is bonded to the back of the foam 12. In one embodiment, the first film 14 is a dual layer film, comprising a high melt polymer film laminated to a low melt polymer film. The low melt film is adjacent to the foam 12 to provide a better bond between the film 14 and the foam 12. A second polymer film 16 is attached to the front of the foam 12. In one embodiment, the second film 16 is a three layer film, comprising a high melt polymer film laminated between a pair of low melt polymer films. The inner low melt film provides a better bond to the foam 12, and the outer low melt film provides a better bond to the cloth cover layer 18.

Figure 3:
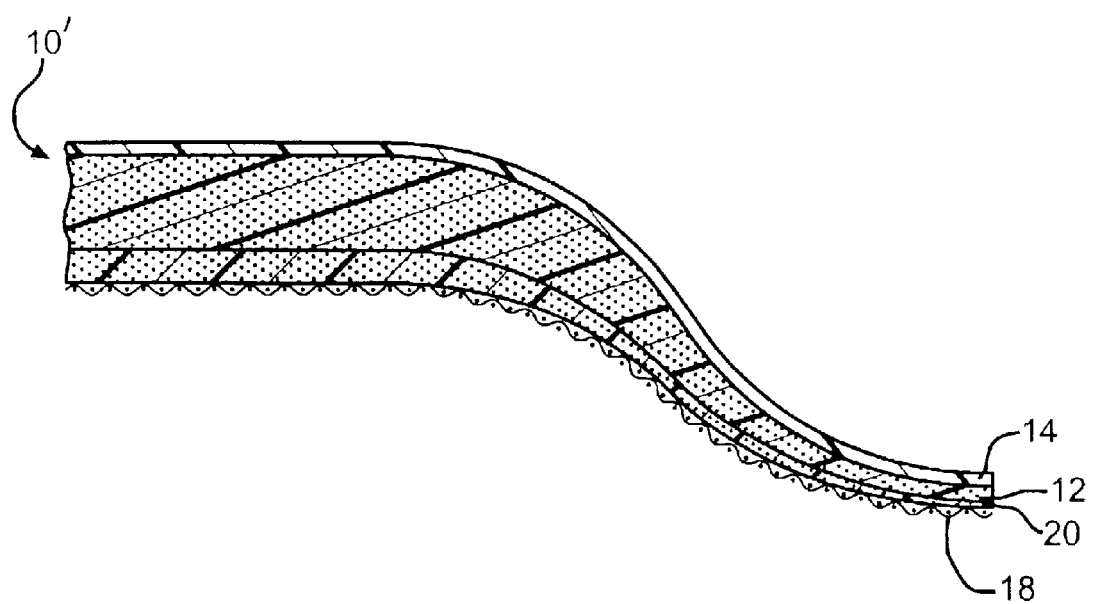
FIG. 3 is a cross-sectional view showing an edge of another embodiment of a flexible headliner for an automotive vehicle according to the invention.

In other embodiments of the invention, the headliner 10 additionally includes a second flexible foam layer between the core layer and the cover layer, or between the core layer and the backing layer. The addition of the second flexible foam layer can provide enhanced acoustics. The second flexible foam layer can have any suitable thickness, for example, up to about 6 millimeters. The headliner 10' shown in FIG. 3 includes the flexible foam core layer 12, a polymer film backing layer 14, a cloth cover layer 18, and a second flexible foam layer 20 between the core layer 12 and the cover layer 18.

The different layers of the headliner can be bonded together by any suitable method(s), and the materials can be cut and formed into the shape of the headliner by any suitable method(s). In a preferred method, the headliner is formed in a mold. Any suitable molding method can be used. In one method, the core layer, cover layer and backing layer (and any additional layers) are prelaminated outside the mold, and the laminate is inserted into the mold for forming into the shape of the headliner. The different layers can be prelaminated by any suitable method(s). For example, bonding methods such as flame bonding are suitable for bonding a polymer film or an additional flexible foam layer to a cloth cover layer. Adhesives can also be used for bonding the layers, for example, between the flexible foam core layer and the additional flexible foam layer.

In another method, the core layer, cover layer and backing layer (and any additional layers) are all inserted into the mold and then laminated and formed inside the mold. The materials are usually formed in a heated mold. However, the mold could also be a cold mold, and at least one of the core layer, cover layer or backing layer being heated outside the mold.

The molded materials can then be trimmed by any suitable method. For example, a hot wire in the mold face can be used to trim the headliner in the mold. Another option is to water jet cut the molded part.

The headliner can be a semi-modular headliner, with no visors or console attached but with other normal components assembled to it. With sufficient reinforcing, the headliner can be modular. The reinforcement can be done by any suitable means. In one embodiment, the reinforcement is a material having properties similar to corrugated cardboard, but consisting of two layers of corrugated polymer. The reinforcement material can be glued to the back film to make the headliner stronger, and it can also be glued to the sheet metal, which will allow it to support a larger load. If the headliner is sufficiently supported, components such as grab handles, wiring, etc., can be added to the headliner to make it modular. Head impact countermeasures can also be attached to the headliner and if properly designed can be used to make it stiffer.

To prevent sags with the headliner, suitable stiffening solutions can be achieved in any manner, for example with an Eften sheet or a set of magnets or pushpins.

The structure of the headliner should give premium acoustics. In particular, the relatively thick foam and the solid film on the back are effective to block noise. In addition to the benefits of flexibility and superior acoustics, the headliner may have other benefits such as a simplified process for forming which lowers capital costs, lower cost cover cloth opportunities, improved durability in handling which minimizes damage, improved bite at pillar interfaces, improved reduction of irritating sounds in the passenger compartment, and the ability to stack mold due to process simplicity to reduce capital costs (which has never been done before for headliners).

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A flexible headliner for an automotive vehicle comprising a flexible foam core layer having a nominal thickness of greater than 5 millimeters, a cover layer bonded to a first side of the core layer, a backing layer bonded to a second side of the core layer opposite the first side, and a film layer disposed between the core layer and the cover layer to bond the cover layer to the first side of the core layer, the headliner being sized and shaped to conform to an interior roof of the vehicle, and wherein the backing layer is generally non-permeable, and wherein the film layer is permeable.

2. The headliner according to claim 1 additionally comprising a second flexible foam layer between the core layer and the cover layer or the backing layer.

3. The headliner according to claim 1 wherein the cover layer is a cloth.

4. The headliner according to claim 3 additionally comprising a second flexible foam layer between the core layer and the cover layer, the second flexible foam layer being bonded to both the core layer and the cover layer.

5. The headliner according to claim 3 wherein the film comprises a high melt polymer layer laminated between first and second low melt polymer layers, the first low melt polymer layer is bonded to the core layer, and the second low melt polymer layer is bonded to the cover layer.

6. The headliner according to claim 1 wherein at least one of the cover layer and the backing layer is a polymer film.

7. The headliner according to claim 6 wherein the film comprises a high melt polymer layer laminated to a low melt polymer layer, and wherein the low melt polymer layer is bonded to the core layer.

8. The headliner according to claim 1 wherein the core layer has a nominal thickness of at least about 15 millimeters.

9. The headliner according to claim 1 additionally comprising a reinforcement that allows the headliner to maintain a desired shape while supporting its own weight and the weight of at least one added component.

10. The headliner according to claim 9 wherein the reinforcement is selected from the group consisting of head impact countermeasures, corrugated materials, push pins, magnets, and combinations thereof.

11. The headliner according to claim 9 additionally comprising a plurality of modular vehicle headliner components.

12. The headliner according to claim 1 wherein the core layer is an open cell foam.

13. The headliner according to claim 1 wherein the core layer is a closed cell foam.

14. The headliner according to claim 1 wherein the core layer is a polymer foam.

15. The headliner according to the claim 14 wherein the core layer is a polyurethane foam.

16. The headliner according to claim 1, wherein the backing layer is a dual layer film comprising a high melt polymer film laminated to a low melt polymer film such that the low melt polymer film is adjacent the core layer.

17. The headliner according to claim 1, wherein the film layer is a three layer film comprising a high melt polymer film disposed between a pair of low melt polymer films.

\* \* \* \* \*